United States Patent
Yan

(10) Patent No.: US 12,253,378 B2
(45) Date of Patent: Mar. 18, 2025

(54) SYSTEMS AND METHODS FOR DETERMINING TRAILER POSE AND COUPLER POSITION FOR AUTOMATED HITCHING

(71) Applicant: Rujiao Yan, Rochester Hills, MI (US)

(72) Inventor: Rujiao Yan, Rochester Hills, MI (US)

(73) Assignee: CONTINENTAL AUTONOMOUS MOBILITY US, LLC., Auburn Hills, MI (US)

( * ) Notice: Subject to any disclaimer, the term of this patent is extended or adjusted under 35 U.S.C. 154(b) by 123 days.

(21) Appl. No.: 17/645,062

(22) Filed: Dec. 20, 2021

(65) Prior Publication Data
US 2023/0194290 A1    Jun. 22, 2023

(51) Int. Cl.
*G01C 21/36*    (2006.01)
*G01C 21/34*    (2006.01)
*G06T 7/73*    (2017.01)

(52) U.S. Cl.
CPC ..... *G01C 21/3623* (2013.01); *G01C 21/3476* (2013.01); *G06T 7/73* (2017.01); *G06T 2207/20081* (2013.01); *G06T 2207/30252* (2013.01)

(58) Field of Classification Search
CPC .... G01C 21/3476; G01C 21/3623; G06T 7/73
See application file for complete search history.

(56) References Cited

U.S. PATENT DOCUMENTS

| | | | |
|---|---|---|---|
| 2016/0304122 A1 | 10/2016 | Herzog et al. | |
| 2017/0282658 A1* | 10/2017 | Shepard | B60D 1/36 |
| 2019/0335100 A1* | 10/2019 | Chen | G06V 20/56 |
| 2021/0034903 A1 | 2/2021 | Daga et al. | |
| 2021/0053407 A1* | 2/2021 | Smith | B60D 1/64 |
| 2021/0086785 A1 | 3/2021 | Niewiadomski et al. | |
| 2021/0170820 A1* | 6/2021 | Zhang | B60D 1/36 |

OTHER PUBLICATIONS

Kaiming He, et al., "Mask R-CNN", Facebook AI Research (FAIR), Jan. 24, 2018, arXiv:1703.00A70.
Yousef Atoum, et al., "Monocular Video-Based Trailer Coupler Detection using Multiplexer Convolutional Neural Network", IEEE ICCV 2017, pp. 5477-5485.

(Continued)

*Primary Examiner* — Seth A Silverman

(57) ABSTRACT

A method for determining a location and pose of at least one trailer for hitching to a vehicle includes: receiving at least one image of at least one trailer generated by a camera of the vehicle; locating the at least one trailer in the at least one image; determining a plurality of keypoints associated with at least one trailer in the image using at least one machine learning model; determining a location of a coupler of the at least one trailer relative to the vehicle and a pose of the at least one trailer relative to the vehicle based on the computed keypoints; and determining a path for maneuvering the vehicle into position for hitching the at least one trailer to the vehicle based on the location of the coupler of the at least one trailer and the pose of the at least one trailer.

22 Claims, 9 Drawing Sheets

(56) References Cited

OTHER PUBLICATIONS

Zhe Cao, et al., "OpenPose: Realtime Multi-Person 2D Pose Estimation using Part Affinity Fields", IEEE Transactions on Pattern Analysis and Machine Intelligence, arXiv preprint arXiv:1812.08008, 2018.
Hao-Shu Fang, et al., "RMPE: Regional Multi-Person Pose Estimation", IEEE ICCV 2017, pp. 2334-2343.
Andrew G Howard, et al., "MobileNets: Efficient Convolutional Neural Networks for Mobile Vision Applications", Apr. 17, 2017, CoRR. abs/1704.04861.
International search report and written opinion dated Apr. 20, 2023 of the counterpart International application PCT/US2022/081987.
Dahal Ashok et al., "DeepTrailerAssist: Deep Learning Based Trailer Detection, Tracking and Articulation Angle Estimation on Automotive Rear-View Camera", published on Oct. 27, 2019—pp. 2339-2346—2019 IEEE/CVF International Conference on Computer Vision Workshop (ICCVW), IEEE.
Atoum Yousef et al., "Monocular Video-Based Trailer Coupler Detection Using Multiplexer Convolutional Neural Network", published on Oct. 27, 2017—pp. 5478-5486 / 2017 IEEE International Conference on Computer Vision (ICCV).

* cited by examiner

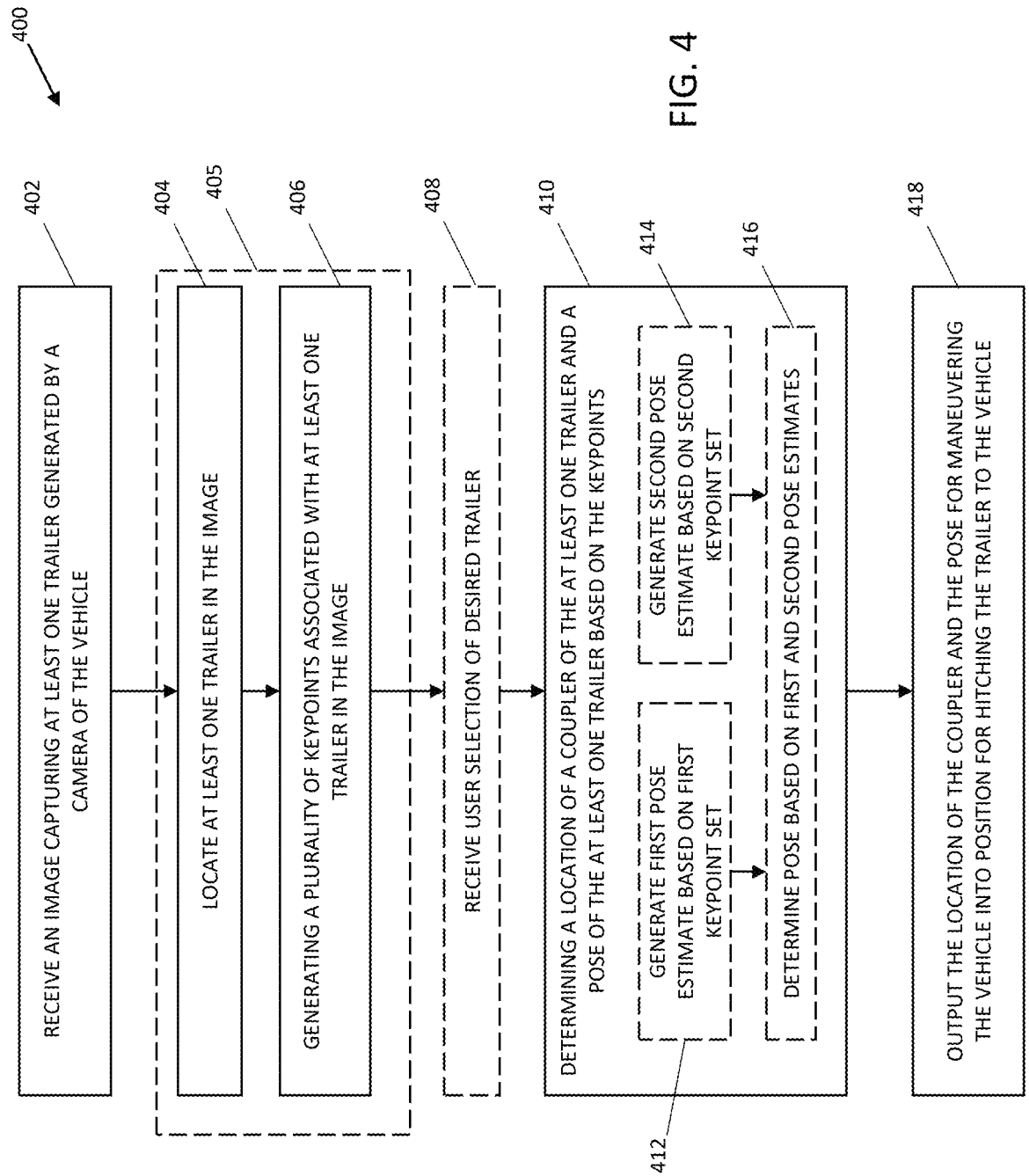

SYSTEMS AND METHODS FOR DETERMINING TRAILER POSE AND COUPLER POSITION FOR AUTOMATED HITCHING

FIELD

This disclosure relates to driver assistance systems for automotive vehicles, and more particularly to automated trailer hitching for automotive vehicles.

BACKGROUND

Advancements in sensor technology have led to improvements in safety systems for vehicles. Systems for detecting and avoiding collisions are increasingly available. Such driver assistance systems use sensors located on the vehicle to detect an oncoming collision. The systems may warn the driver of various driving situations to prevent or minimize collisions and, in some cases, may control the vehicle to avoid or minimize collisions. Increasingly, driver assistance systems are capable of taking over aspects of vehicle control from the driver. For example, lane departure systems may attempt to keep the vehicle in a lane through control of the steering system. Some driver assistance systems can automate tasks that some drivers may find difficult. For example, some driver assistance systems can automatically parallel park a vehicle—a task that many find quite challenging.

Another challenging task is the hitching of a trailer to a vehicle. This task is difficult for a single person to do and usually involves the cooperation of multiple people, one to control the vehicle and the other to view the vehicle and trailer and provide guidance to the driver regarding how to maneuver the vehicle to align it with the hitch. Those unaccustomed to hitching a vehicle to a trailer may have some difficulty in maneuvering the vehicle into position for hitching or providing proper instructions for directing the path of the vehicle. Hitching assist systems are driver assistance systems that automate the difficult task of trailer hitching. They use various sensors to attempt to detect a trailer and its coupler and control the vehicle to maneuver it into position for hitching the trailer to the vehicle. However, hitching assist systems often have trouble reliably locating trailer couplers, particularly given the wide variability in trailer types and hitching situations.

SUMMARY

According to various aspects, systems and methods use one or more machine learning models to identify a trailer in an image generated by a vehicle-mounted camera, locate the coupler of the trailer, and determine the pose of the trailer. The coupler position and trailer pose are used to plan a path for maneuvering the vehicle into position for hitching the trailer to the vehicle. A keypoint detection machine-learning model may be trained to detect keypoints on the trailer that can be used to determine the coupler position and trailer pose. According to some embodiments, multiple trailers can be simultaneously detected, along with their keypoints.

According to various aspects, multiple estimates of trailer pose may be generated based on different sets of keypoints and the trailer pose determination may be a weighted combination of the multiple estimates. The weighting may be based on reliability of the respective estimates and may be a dynamic weighting that adjusts according to the circumstances. For example, the weighting may be based on distance between the vehicle and trailer such that a first estimate is weighted more than a second estimate when the vehicle and trailer are far apart but is weighted less than the second estimate when the vehicle and trailer are near. By using a weighted combination of estimates of trailer pose from keypoints generated by the same machine-learning model, the trailer coupler position and trailer pose determination is robust to different circumstances.

According to an aspect, a method for determining a location and pose of at least one trailer for hitching to a vehicle includes receiving at least one image of at least one trailer generated by a camera of the vehicle; locating the at least one trailer in the at least one image; determining a plurality of keypoints associated with at least one trailer in the image using at least one machine learning model; determining a location of a coupler of the at least one trailer relative to the vehicle and a pose of the at least one trailer relative to the vehicle based on the computed keypoints; and determining a path for maneuvering the vehicle into position for hitching the at least one trailer to the vehicle based on the location of the coupler of the at least one trailer and the pose of the at least one trailer.

Optionally, the keypoints include a first set of keypoints associated with a tow bar of the at least one trailer and a second set of keypoints associated with a body of the at least one trailer from which the tow bar extends.

Optionally, determining the pose of the at least one trailer includes: generating a first estimate of the pose of the at least one trailer based on the first set of keypoints; generating a second estimate of the pose of the at least one trailer based on the second set of keypoints; and determining the pose of the at least one trailer based on the first and second estimates.

Optionally, the first and second estimates of the pose of the at least one trailer are weighted based on a distance to the at least one trailer.

Optionally, the first estimate of the pose is weighted lower than the second estimate of the pose for a greater distance and the first estimate of the pose is weighted higher than the second estimate of the pose for shorter distance.

Optionally, the method further includes updating the location of the coupler of the at least one trailer and a pose of the at least one trailer based on new images generated as the vehicle maneuvers toward the at least one trailer.

Optionally, the at least one image captures a plurality of trailers and keypoints are identified for the plurality of trailers.

Optionally, the location of the coupler of the at least one trailer and the pose of the at least one trailer are determined for a trailer selected by a driver of the vehicle from among the plurality of trailers in the at least one image.

Optionally, a single machine learning model locates the at least one trailer and determines the plurality of keypoints.

Optionally, the single machine learning model includes a keypoint detector.

According to an aspect, a system for determining a location and pose of at least one trailer for hitching to a vehicle, the system comprising one or more processors, memory, and one or more programs stored in the memory and including instructions for execution by the one or more processors for: receiving at least one image of at least one trailer generated by a camera of the vehicle; locating the at least one trailer in the at least one image; determining a plurality of keypoints associated with at least one trailer in the image using at least one machine learning model; determining a location of a coupler of the at least one trailer relative to the vehicle and a pose of the at least one trailer relative to the vehicle based on the computed keypoints; and determining a path for maneuvering the vehicle into position for hitching the at least one trailer to the vehicle based on the location of the coupler of the at least one trailer and the pose of the at least one trailer.

Optionally, the keypoints include a first set of keypoints associated with a tow bar of the at least one trailer and a second set of keypoints associated with a body of the at least one trailer from which the tow bar extends.

Optionally, determining the pose of the at least one trailer includes: generating a first estimate of the pose of the at least one trailer based on the first set of keypoints; generating a second estimate of the pose of the at least one trailer based on the second set of keypoints; and determining the pose of the at least one trailer based on the first and second estimates.

The system of claim 13, wherein the first and second estimates of the pose of the at least one trailer are weighted based on a distance to the at least one trailer.

Optionally, the first estimate of the pose is weighted lower than the second estimate of the pose for a greater distance and the first estimate of the pose is weighted higher than the second estimate of the pose for shorter distance.

Optionally, the one or more programs including instructions for: updating the location of the coupler of the at least one trailer and a pose of the at least one trailer based on new images generated as the vehicle maneuvers toward the at least one trailer.

Optionally, the at least one image captures a plurality of trailers and keypoints are identified for the plurality of trailers.

Optionally, the location of the coupler of the at least one trailer and the pose of the at least one trailer are determined for a trailer selected by a driver of the vehicle from among the plurality of trailers in the at least one image.

Optionally, a single machine learning model locates the at least one trailer and determines the plurality of keypoints.

Optionally, the single machine learning model includes a keypoint detector.

It will be appreciated that any of the variations, aspects, features, and options described in view of the systems apply equally to the methods and vice versa. It will also be clear that any one or more of the above variations, aspects, features, and options can be combined.

BRIEF DESCRIPTION OF THE DRAWINGS

The invention will now be described, by way of example only, with reference to the accompanying drawings, in which:

FIG. 4 is a flow diagram of an exemplary method for determining the position of a coupler of at least one trailer and a pose of the at least one trailer for use by a hitching assist system of a vehicle;

DETAILED DESCRIPTION

Figure 1:
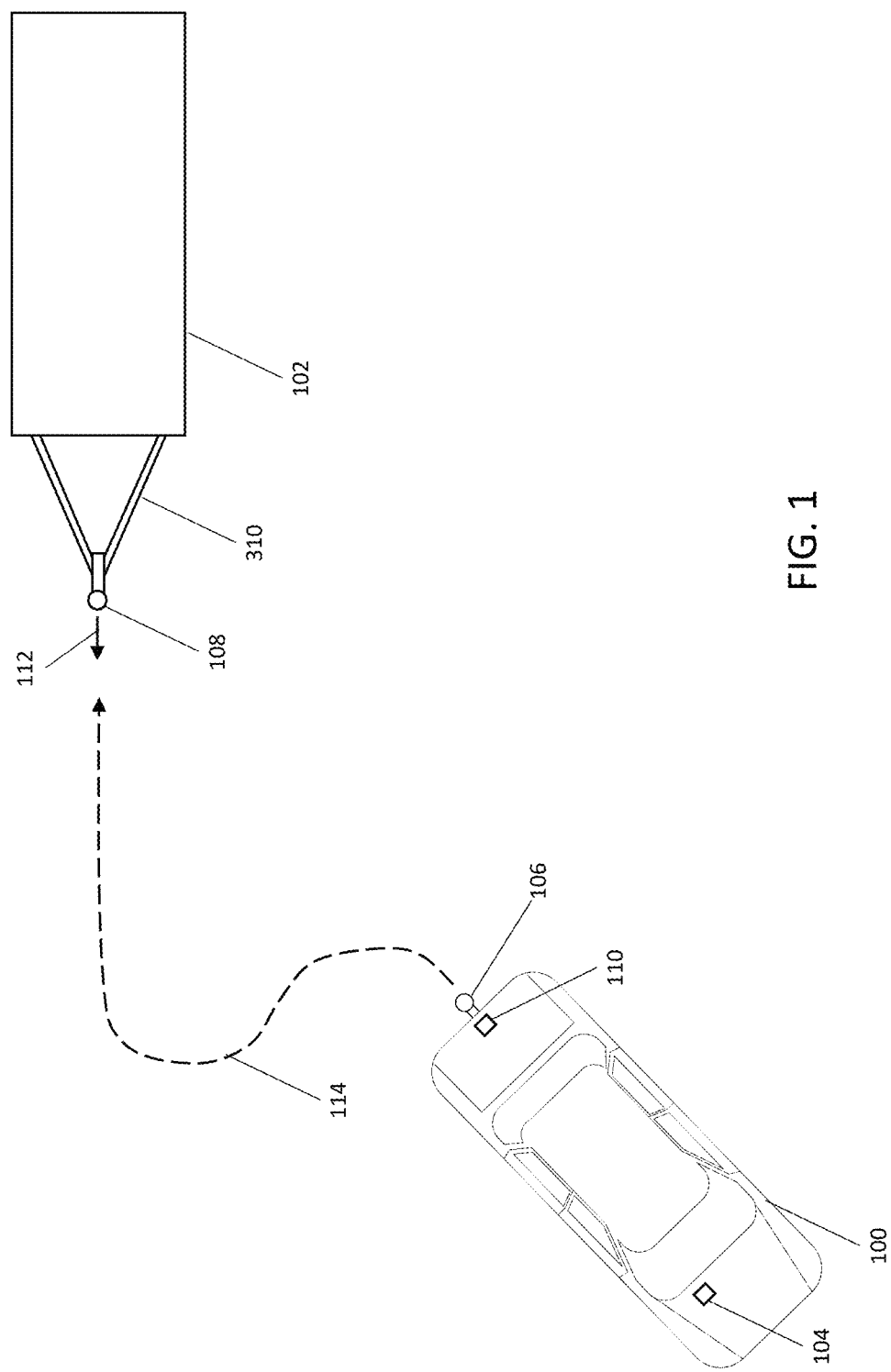
FIG. 1 illustrates an exemplary automotive vehicle and an exemplary trailer for hitching to the vehicle.

Described herein are various aspects of systems and methods for determining the position and pose of a trailer for determining a path for maneuvering an automotive vehicle into position for hitching the trailer to the vehicle. Imaging (single snapshot(s) and/or video frames) of a trailer generated by at least one camera on the vehicle are analyzed by one or more machine-learning models to identify characteristics of the trailer in the imaging. The characteristics can be used to determine the location of the coupler of the trailer and the pose of the trailer. With this information, a path for the vehicle to maneuver into place for hitching the trailer to the vehicle can be generated that not only aligns the hitch on the vehicle to the coupler on the trailer but also aligns the vehicle with the trailer such that, for example, the vehicle and trailer are oriented in substantially the same direction. The vehicle may then be autonomously or semi-autonomously maneuvered based on the path. The trailer coupler location and pose can be updated over time as the vehicle moves closer to the trailer and the path can be updated based on updated trailer coupler location and pose.

The characteristics of the trailer identified by the one or more machine-learning models can include locations of various distinctive portions of the front of the trailer in the imaging. The relative locations of these distinctive portions of the front of the trailer can be used to determine the pose of the trailer in the imaging—i.e., the direction that the trailer is facing. The distinctive portions identified by the machine-learning model(s) can include portions of the tow bar assembly, such as the location of the coupler, and/or the location of the corners of the tow bar assembly where the tow bar assembly meets the main body of the trailer. Portions of the main body of the trailer (as used herein, "main body" refers to the portion of the trailer from which the tow bar assembly extends) may also be identified and used to determine a pose of the trailer. For example, the four corners of a front portion of the main body may be identified and the relative locations of the corners can be used to determine the pose of the trailer.

Multiple estimates of the pose of the trailer may be generated based on different characteristics of the trailer identified in the imaging. For example, a first pose estimate may be generated based on characteristics of the tow bar assembly and a second pose estimate may be generated based on characteristics of the main body of the trailer. The multiple estimates may be resolved using any suitable weighting algorithm. Weighting of the various estimates may depend on the distance between the vehicle and the trailer as determined from the characteristics of the trailer in the imaging to account for the reliability of the respective estimation as a function of the clarity of the respective portions of the trailer in the images. For example, when the vehicle is relatively far from the trailer and the tow bar assembly is less clear, an estimate of pose from the tow bar assembly may be less reliable than an estimate of pose from the front portion of the main body of the trailer. Therefore, at the relatively far distance, the pose estimate from the tow bar assembly can be weighted lower than the pose estimate from the front of the main body. The weighting may change over time as the vehicle moves closer to the trailer and may change to the point that the tow bar-based pose estimate is weighted higher than the main body-based pose estimate.

The machine-learning model(s) used to identify characteristics of the trailer in the imaging can include a keypoint detection neural network that detects multiple keypoints associated with the trailer. The keypoints can include, for example, the location of the coupler and the corners of the tow bar assembly. The keypoints may also include the corners of the front of the main body of the trailer. As noted above, the relative locations of these keypoints can be used to determine the pose of the trailer in the imaging using any suitable pose estimation algorithm. In some embodiments, a single machine-learning model is used to simultaneously detect multiple trailers in the imaging and their keypoints. The machine-learning model can be a convolution neural network, such as a mask region-based convolutional neural network (Mask R-CNN). In some embodiments, where multiple trailers are detected, a user selects a desired trailer for hitching, and thereafter, only a region of interest associated with the selected trailer is searched for keypoints of the selected trailer by the machine learning model. The region of interest associated with the selected trailer may be tracked using a region of interest tracker, with the tracked region of interest being provided to the keypoint detector.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware, and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating," or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates an exemplary automotive vehicle 100 and an exemplary trailer 102 for hitching to the vehicle 100. The vehicle 100 includes a hitching assist system 104 that can autonomously or semi-autonomously maneuver the vehicle 100 into the appropriate location to align the hitch ball 106 on the vehicle 100 with the coupler 108 of the trailer 102 for hitching the trailer 102 to the vehicle 100. The hitching assist system 104 may interact with other vehicle systems, which can include, for example, a steering system, a suspension adjustment system, and/or an electronic brake system, to maneuver the vehicle into position for hitching, one or more sensors sensing aspects of the environment including the trailer 102 and/or one or more user interfaces to receive inputs from a user. The hitching assist system 104 may be included with a trailer backing assist system, which can be used to maneuver the vehicle 100 and trailer 102 combination after the trailer 102 is secured to the vehicle 100. The hitching assist system 104 can include a controller that can be common to other vehicle systems, such as a driver assist system, the suspension adjustment system, and/or the electronic brake system, or may be a dedicated controller. The hitching assist system 104 may be activated manually, such as a by a user selection (e.g., via a button or touch screen input in the vehicle 100), and/or may be activated automatically, such as when the vehicle is placed in reverse gear or when a trailer is detected in imaging, as discussed further below.

The vehicle 100 includes one or more rearward viewing cameras 110 for generating images (snapshots or video frames) of a scene behind the vehicle 100. Image data from the one or more cameras 110 is received by the hitching assist system 104, which analyzes the imaging data to determine the location of the coupler 108 and the pose 112 of the trailer 102. When activated, the hitching assist system 104 may process imaging data on a continuous basis, such as every frame or every $n^{th}$ frame (e.g., every $5^{th}$ frame, every $10^{th}$ frame, etc.).

The hitching assist system 104 uses the location of the coupler 108 and the pose 112 of the trailer 102 determined from the imaging data to determine a path 114 for maneuvering the vehicle 100 into position for hitching the trailer 102 to the vehicle 100. Determining the pose 112 of the trailer 102 enables a path 114 to be determined that will result in the vehicle 100 being aligned with the trailer 102 and the hitch ball 106 being positioned proximate the coupler 108. The path 114 may be updated as the vehicle 100 moves along the path 114 based on updated imaging data. The hitching assist system 104 may use other inputs in addition to the pose and pose information for the trailer when maneuvering the vehicle toward the trailer. For example, the hitching assist system 104 may adjust the path 114 to avoid one or more detected obstacles, which may be detected in the imaging from the camera 110 and/or may be detected by one or more other sensors, such as one or more infrared sensors, optical sensors, laser sensors, etc.

Figure 2:
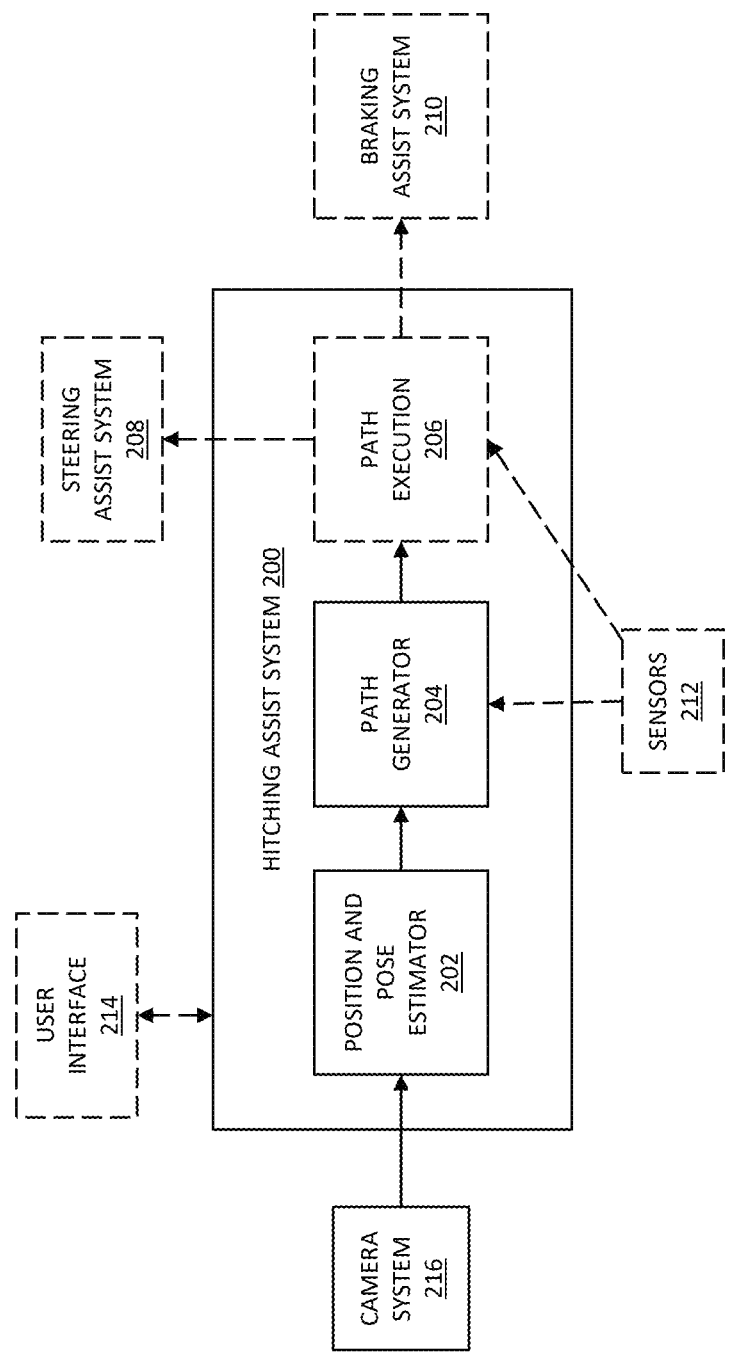
FIG. 2 is a functional block diagram of an exemplary hitching assist system.

FIG. 2 is a functional block diagram of a hitching assist system 200, according to various aspects of the present disclosure. Hitching assist system 200 could be used, for example, for hitching assist system 104 of vehicle 100 of FIG. 1. The functional blocks in FIG. 2 indicate discrete functions but do not necessarily indicate discrete physical systems. Each of the functional blocks could be implemented by the same computing system or could be implemented by different computing systems.

Hitching system 200 includes a trailer coupler and position and pose estimator 202 that determines position of the coupler and the pose of at least one trailer from one or more images generated by a camera system 216 and a path generator 204 that computes a path for maneuvering a vehicle into position for hitching the trailer to the vehicle based on the coupler position and trailer pose generated by the position and pose estimator 202. The path generator 204 may take into consideration inputs from one or more sensors 212 when generating the path. For example, the path may be adjusted based on one or more detected obstacles.

The path generator 204 provides a generated path to a path executor 206, which can be a component of the hitching assist system 200 or could be a component of a separate system. The path executor 206 may autonomously or semi-autonomously control the vehicle to maneuver it into position for hitching the trailer to the vehicle based on the path computed by the path generator 204. The path executor 206 may control one or more vehicle maneuvering systems, such as a steering assist system 208 and/or a braking assist system 210, to maneuver the vehicle on the path generated by the path generator 204. The path executor 206 may alter the path of the vehicle based on information received from the one or more sensors 212, such as to avoid an obstacle.

The hitching assist system 200 may be communicatively connected to a user interface 214 for providing information to and/or receiving commands from a user. The user interface 214 could be or include, for example, an infotainment system of the vehicle. A user may use the user interface 214 to provide inputs to the hitching assist system 200, such as to activate or deactivate the system and/or to confirm selection of a trailer for hitching and/or to confirm that the vehicle should be maneuvered to a trailer. The hitching assist system 200 could use the user interface 214 to display information to the user, such as an indication of a selected trailer for hitching, a status of the hitching assist system 200, and/or a status of a hitching process.

The camera system 216 that generates imaging data for analysis by the position and pose estimator includes one or more rear-view cameras. For example, a camera could be positioned on or near the rear bumper of the vehicle. The position and pose estimator 202 may receive individual images (e.g., a snapshot or a video frame) or video frames from the camera system 216. The position and pose estimator 202 may analyze each image or video frame generated by the camera system 216 (such as during the time that the hitching assist system is activated) or may analyze fewer than all images or video frames, such as once every $n^{th}$ frame or once every n seconds (where n may be a whole number or a fraction).

Figure 3:
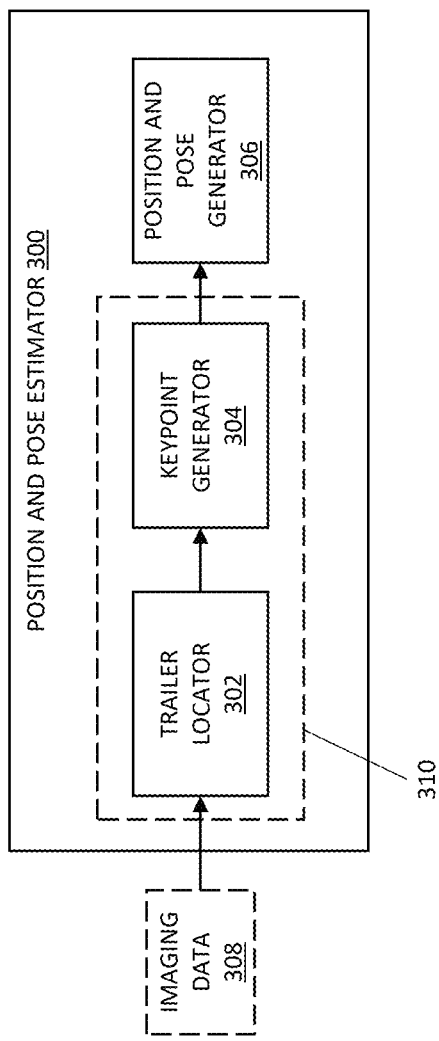
FIG. 3 is a functional block diagram of an exemplary coupler position and trailer pose estimator.

Aspects of the position and pose estimator 202, according to various embodiments, are shown in more detail in the functional block diagram of FIG. 3, which illustrates a position and pose estimator 300 that can be used for the position and pose estimator 202.

The position and pose estimator 300 receives imaging data 308, which can be a single image or a video frame. The position and pose estimator 300 includes a trailer locator 302 that locates at least one trailer in an image (as used herein the term "image" refers to both a snapshot image and a video frame). The trailer locator 302 may output a bounding box that encompasses the at least one trailer. The trailer locator 302 may be configured to identify multiple trailers in an image and output a bounding box for each trailer.

A keypoint generator 304 identifies a plurality of keypoints of the at least one trailer located by the trailer locator 302. As is known in the field of computer vision, the term "keypoint" generally refers to a point in an image that has specific properties, which may be application-dependent. For example, keypoints may be defined as points that are well-localizable in the face of image noise: if the same image is seen with a different amount of noise, the location of a keypoint should not change. Keypoints may also be defined in terms of repeatability: if an image of the same scene is taken from the same viewpoint at different points in time, possibly with different illumination characteristics, the same keypoint should be recognizable across all such images. Other useful characteristics of keypoints can be defined in terms of geometric invariance (i.e., the ability to recognize the projection of the same surface point in different images taken from different viewpoints), or distinctiveness (i.e., the unique characters of the local image appearance in the neighborhood of a keypoint). The keypoint generator 304 may search for any suitable keypoints of a trailer that are useful for determining the position of the coupler of the trailer and the pose of the trailer. The number and location of keypoints may be dependent upon the type of trailer. As such, the keypoint generator 304 may compute different keypoints for different types of trailers. The keypoints that the keypoint generator 304 is configured to identify are based on the training data used to train the machine-learning model or models that implement the keypoint generator 304. Training data may be manually labeled and training data associated with different types of trailers may be labeled with different locations of keypoints and/or different numbers of keypoints. By training the keypoint generator 304 on different types of trailers, the system can be configured to reliably detect the keypoints of different types of trailers.

The keypoint generator 304 may search for keypoints in only the portion of the image that includes the at least one trailer located by the trailer locator 302, which can help reduce processing time relative to searching the entire image. The trailer locator 302 and keypoint generator 304 may be implemented by a single machine-learning model 310, such by two or more different branches of a machine-learning model. This can provide faster processing as compared to using multiple different machine-learning models, which can be important for providing adequate responsiveness for the trailer hitching assist system. The machine-learning model 310 can be or include, for example, a keypoint detection neural network. The machine-learning model 310 can be a convolutional neural network, such as Mask R-CNN. In some variations, the trailer locator 302 and keypoint generator 304 are implemented by different machine-learning models. For example, a first machine-learning model, such as first convolutional neural network (e.g., YOLO, Faster RCNN, R-FCN, SSD), may be used to set a bounding box for any trailers in the image, and a second machine-learning model, such as a second convolutional neural network (e.g. OpenPose, keypoint RCNN), may search the areas within any bounding boxes for keypoints. The machine-learning model can simultaneously identify keypoints of multiple trailers in an image.

The keypoints identified by the keypoint generator 304 are provided to the position and pose generator 306, and can be in the form of x and y positions within the image. The position and pose generator 306 generates an estimate of the position of the coupler of the trailer and the pose of the trailer based on the keypoints, as well as knowledge about the camera system, such as position of the camera(s) on the vehicle, focal length of the camera(s), etc. The position and pose generator 306 may generate the position and pose of the trailer in a coordinate system that is suitable for output to a path generator, such as path generator 204 of FIG. 2. For example, the position and pose generator 306 may output position and pose relative to a camera-based reference frame, relative to a vehicle-based reference frame, or relative to a global reference frame. The position of the coupler and pose of the trailer can be determined from the keypoints according to known machine-vision pose estimation techniques. For example, the position of the coupler and pose of the trailer can be calculated from the positions of the keypoints in the image using geometric relationships according to well-known techniques.

In some embodiments, multiple initial estimates of the pose of the trailer are generated based on different sets of keypoints, and the initial estimates may be combined to generate a final pose estimate. This can help improve the robustness of the pose estimate. In at least some examples, different pose estimates may be weighted differently based on an expected accuracy of a given pose estimate. The weighting could be dependent upon various factors, such as distance of the vehicle from the trailer, brightness of the image, size of the trailer, type of trailer, vehicle camera characteristics, etc. The weighting could be different from one pose estimate to the next, such as when the weighting is dependent upon distance between the vehicle and trailer and pose estimates are generated as the vehicle is moving toward the trailer. For example, a pose estimate based on keypoints of a feature of the trailer that is highly visible in far distance (between the vehicle and trailer), such as a front of a main body of the trailer, may be weighted higher than a pose estimate based on keypoints of a feature of the trailer that is not highly visible in far distance, such as the tow bar, when the vehicle is relatively far from the trailer, because it is likely that the tow bar is not well captured in the image at far distance and its pose estimate would likely not be as accurate as the pose estimate from the main body. However, when the vehicle moves closer to the trailer and the tow bar becomes more visible, the pose estimate from the tow bar may be more accurate than the pose estimate from the main body, and thus, the tow bar pose estimate may be weighted higher than the main body pose estimate in near distance. The number of initial pose estimates (pose estimates based on different sets of keypoints) is not limited to two; any number of initial pose estimates may be used. Any suitable weighting function can be used. For example, the weighting function can be a stepwise or continuous function of one or more factors (e.g., distance, brightness, size of the trailer, type of trailer, etc.).

Figures 8A, 8B:
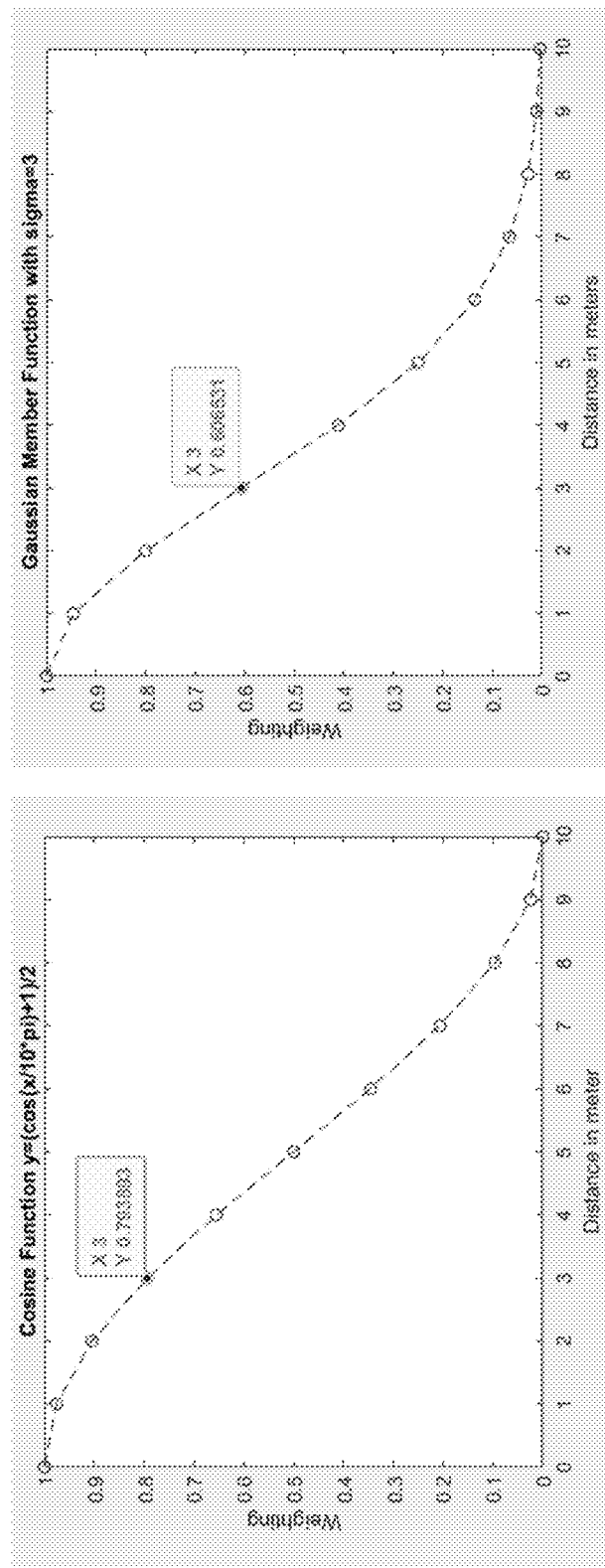
FIGS. 8A and 8B illustrate exemplary weighting functions for weighting multiple pose estimates for combining into a single pose determination.

FIGS. 8A and 8B illustrate exemplary weighting functions for weighting multiple pose estimates for combining into a single pose determination. In the illustrated examples, the weighting is a function of distance between the vehicle and the trailer. The x axes are distance in meters and the y axes are the weights applied to a first pose estimate. The pose is determined by adding a first pose estimate multiplied by the weighting and a second pose estimate multiplied by one minus the weighting, as follows:

$$\text{Pose} = \text{Pose Estimate 1} \times \text{Weighting} + \text{Pose Estimate 2} \times (1 - \text{Weighting})$$

Since the weighting in the illustrated embodiments is maximum at the minimum distance, a pose estimate that is based on tow bar keypoints, which may be more reliable in near distance, could be used for Pose Estimate 1 and a pose estimate that is based on the main body keypoints, which may be more reliable in far distance, could be used for Pose Estimate 2.

The weighting function illustrated in FIGS. 8A and 8B are a cosine function and a Gaussian member function, respectively. The type of weighting function and/or the parameters that define the weighting function can be selected according to desired performance of the weighting. In the illustrated example, a maximum distance of ten meters is used merely as an example. Any suitable distance value could be used. According to various embodiments, distance may be determined by determining a distance in the image between a bottom of the image and a suitable portion of the trailer, such as the coupler (for example, as determined by the coupler keypoint). This image-based distance could be converted to world-based distance using the known calibration parameters of the camera. Although the illustrated weighting functions are based on distance between the vehicle and trailer, similar weighting functions could be based on any other suitable parameter or parameters, including image brightness, trailer size, trailer type, vehicle camera characteristics, etc.

Figure 5A:
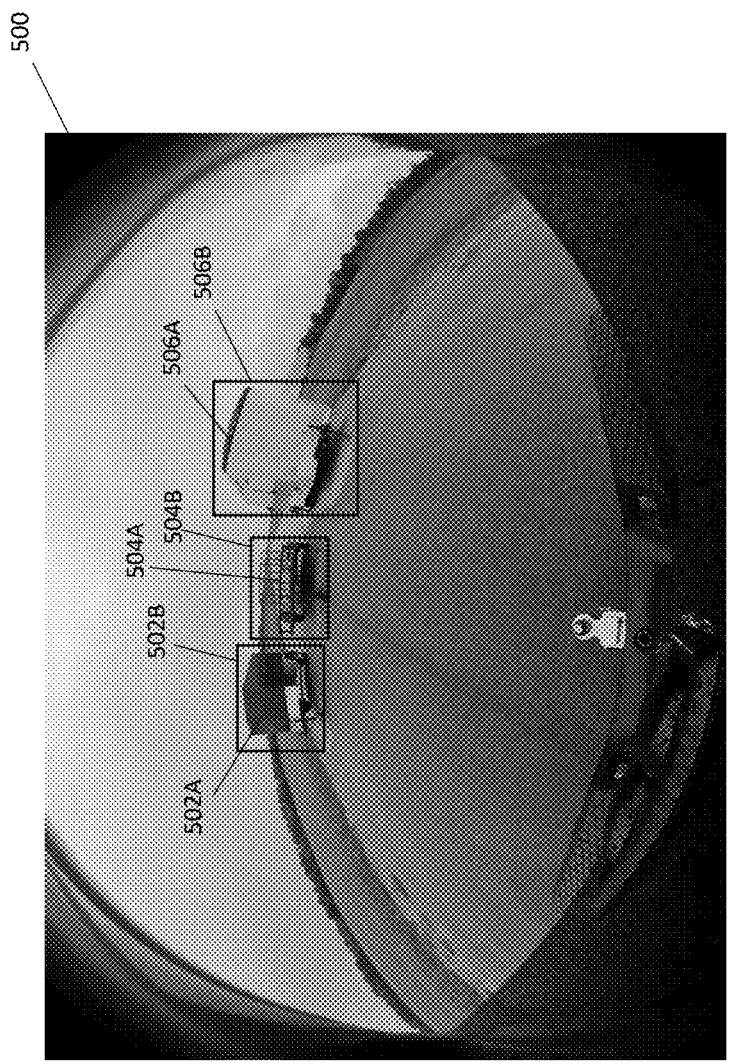
FIG. 5A illustrates an exemplary image of a multiple trailers and bounding boxes locating the trailers.

FIG. 4 illustrates a method 400 for determining the position of a coupler of at least one trailer and a pose of the at least one trailer for use by a hitching assist system of a vehicle, such as hitching assist system 200 of FIG. 2 for hitching vehicle 100 of FIG. 1 to trailer 102 of FIG. 1. At step 402, at least one image capturing at least on trailer is received by a hitching assist system. The image is captured by a camera system of the vehicle, such as camera 110 of FIG. 1. The image can capture a single trailer or multiple trailers. FIG. 5A illustrates an example of an image 500 generated by a vehicle-mounted camera that captures a plurality of trailers 502A, 504A, and 506A located behind the vehicle.

At step 404, the trailer(s) in the image is located. In some embodiments, a bounding box may be computed for each trailer in the image. This step can be performed by the position and pose estimator 202 of FIG. 2 and by position and pose estimator 300 of FIG. 3, such as by trailer locator 302 of FIG. 3. With reference to FIG. 5A, the three trailers in the image 500—trailers 502A, 504A, and 506A—have been identified and bounding boxes 502B, 504B, and 506B have been generated for each trailer. The trailer(s) may be identified by a machine-learning model, such as a convolutional neural network.

At step 406, a plurality of keypoints associated with each trailer in the image are generated, such as by keypoint generator 304 of position and pose estimator 300 of FIG. 3. The keypoints may be generated using a machine-learning model. The machine-learning model may be the same model used for step 404, as indicated by block 405 in FIG. 4, or may be a different model. Only the bounding box portions of the image as determined in step 404 may be searched for keypoints, which may reduce processing time. In embodiments in which a single machine-learning model performs trailer locating and keypoint generating, the trailer locating may be done by a first stage of the model and its bounding boxes may be provided as inputs to a second stage that performs the keypoint detection. Where an image has multiple trailers, keypoints for the multiple trailers may be generated simultaneously.

The machine-learning model can be or include, for example, a keypoint detection neural network. The machine-learning model can be a convolutional neural network, such as a Mask R-CNN. The machine-learning model may be trained for identifying any suitable keypoints. The machine-learning model may be a supervised machine-learning model trained on labeled images in which the locations of keypoints are manually labeled. Generally, the training data should include images that include types of trailers that are desired to be detected and that show the trailer(s) in varying quality according to what may be expected during use. For example, the training images may include images at different resolutions, different light qualities, and/or different weather conditions, images that capture different distances between the trailer and vehicle and/or different poses of the trailer relative to the vehicle, and/or images generated from different camera types.

Neural networks used herein for keypoint detection, such as Mask R-CNN, may have been originally developed for detecting human body keypoints. Since the requirement of keypoint position accuracy is lower for human body keypoints than for trailer hitching, the neural network is modified for increasing keypoint-level localization accuracy by increasing the density of the feature map. For example, with Mask R-CNN, the feature map resolution from ROI-Align can be increased.

According to various embodiments, the machine-learning model for keypoint detection is configured for low latency such that keypoint detection can be done in real time. According to various embodiments, inference time can is reduced by pruning the neural network, which is possible since keypoint detection in the trailer hitching application is generally much simpler than that in human pose detection. Additionally or alternatively, tools such as NVIDIA's TENSOR RT, which is a library developed by NVIDIA for faster inference on NVIDIA graphics processing units (GPUs), can be used. In some embodiments, a faster backbone such as MobileNet is used and the region proposal number is reduced, since trailer number in the trailer hitching application is limited.

Figure 5B:
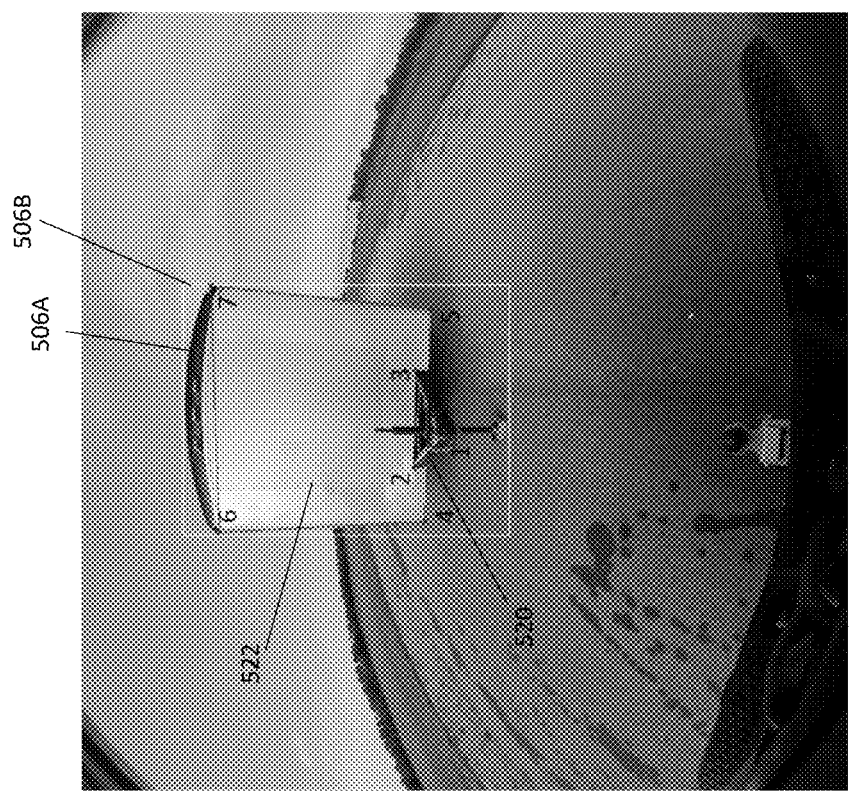
FIG. 5B illustrates an exemplary set of keypoints identified for a trailer.

FIG. 5B illustrates an example of suitable keypoints of trailer 506A. Keypoint 1 corresponds to the coupler. Keypoint 2 corresponds to the right-side meeting point between the tow bar 520 and the main body 522 of the trailer 506A. Keypoint 3 corresponds to the left-side meeting point between the tow bar 520 and the main body 522. Keypoints 4, 5, 6, and 7 are associated with the four corners of the front of the main body 522. These keypoints are merely exemplary and not intended to be limiting. More or fewer keypoints may be identified.

Figure 6:
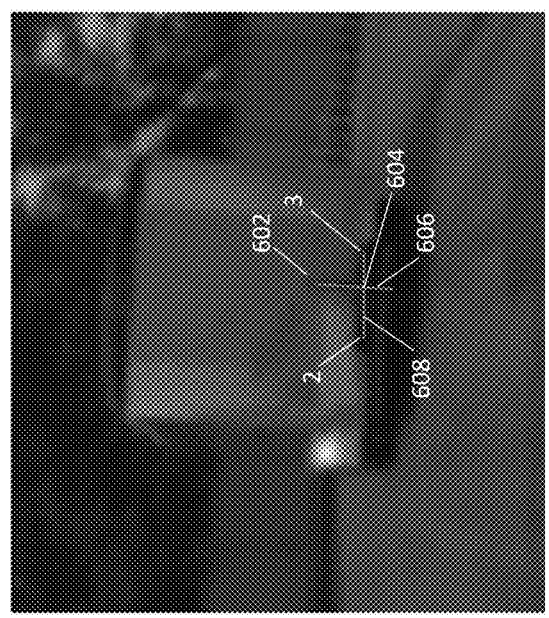
FIG. 6 illustrates exemplary aspects of labeling training data for coupler keypoint identification.

Since keypoint 1 is the coupler, keypoint 1 may always be labeled in the machine-learning model training data. It may be difficult to identify the coupler in images in which the trailer is at a relatively far distance from the vehicle. In order to still label the coupler, the coupler point may be labeled as an intersection between a line connecting keypoints 2 and 3 and a line extending along the jack stand of the trailer. An example of this is shown in FIG. 6, which is an example of a training image in which the coupler itself is difficult to discern but keypoints 2 and 3 are evident, as is the jack stand 602. The intersection 604 of a line 606 passing through the jack stand 602 and a line 608 passing through keypoints 2 and 3 is labeled as the coupler. By training in this way, the machine-learning model can output the coupler position even when the coupler is not visible in the image. The closer the vehicle gets to the trailer, the more accurate the coupler localization is, since the coupler will eventually become visible in the image. Since the system requires more accurate coupler position in near distance than the far distance, inaccuracies in the far distance arising from the approximation of the coupler position described above will not seriously affect the hitching process.

Method 400 may continue with optional step 408 in which a user selection of a desired trailer for hitching may be received. This step may be used, for example, when multiple trailers are detected in the imaging. The user may be provided with an indication of the multiple trailers and a request for a selection of the trailer that the user would like to hitch to the vehicle. For example, an image of the trailers with bounding boxes around the trailers may be displayed to the user, such as on a touch screen display of the vehicle. The user may then provide a selection by touching the desired trailer in the displayed image. This is just one example of how a user may select a trailer from among multiple trailers in an image. Other options could include a selector that selects from a list or that scrolls between bounding boxes in a displayed image. In situations in which only one trailer is provided in the image, the hitching assist system may still request confirmation by the user that the user would like to hitch to the trailer detected in the image. In some embodiments, step 408 is performed after the trailer(s) in the image are identified but before the keypoints are determined, and the keypoint search may be conducted only for the bounding box of the user-selected trailer. This could help reduce the amount of processing needed to compute the keypoints. In some embodiments, keypoints may be detected for all trailers in an image in an initial stage prior to the user selecting a desired trailer. Then, once the user has selected a desired trailer, subsequent keypoint detection (for example, performed as the vehicle is backing toward the trailer for path refinement) may be performed only for the tracked bounding box associated with the selected trailer. In some embodiments, once a user has selected a trailer, only a region of interest associated with the selected trailer is analyzed for keypoint detection in subsequent image analysis steps (e.g., step 406). In some embodiments, a region of interest tracker is used to track the region of interest associated with the selected trailer. The region of interest tracker then provides the region of interest associated with the selected trailer to the keypoint detector. This can help reduce computing resources used for keypoint detection, reducing latency. Examples of suitable region of interest trackers include Channel and Spatial Relatibility Tracking (CSRT), which trains a correlation filter with compressed features (HoG and Colornames) and uses the filter to search the area around the last known position of the selected trailer in successive frames, Kernelised Correlation Filter (KCF), which trains a filter with patches containing the selected trailer as well as nearby patches that do not, which allows the tracker to search the area around the previous position and exploit the fact that nearby patches are likely to contain the selected trailer, and Tracking-Learning-Detection (TLD), which trains a classifier that is used to re-detect the object and correct tracking errors.

Method 400 continues to step 410 in which a location of a coupler of at least one trailer in the image and a pose of the at least one trailer is determined based on the keypoints identified in step 406. For example, with reference to FIG. 1, the position of the coupler 108 and the pose 112 of the trailer 102 in any suitable reference frame may be determined. As noted above, the keypoints may be provided as x and y positions in the image and the position of the coupler and the pose of the trailer may be determined based on these values in addition to known parameters associated with the vehicle and the camera system, such as position of the camera(s) on the vehicle, focal length of the camera(s), etc. The coupler position and pose of the trailer may be determined in any suitable coordinate system, such as a camera-based reference frame, a vehicle-based reference frame, or a global reference frame. The position of the coupler and pose of the trailer can be determined from the keypoints according to known machine-vision pose estimation techniques.

In some embodiments, determining the pose of trailer may include generating multiple estimates of trailer pose using different sets of keypoints and combining the estimates in a suitable manner to arrive at a final pose determination. This is represented by optional steps 412, 414, and 416 in FIG. 4. At step 412, a first pose estimate is generated based on a first set of keypoints. With reference to FIG. 5B, the first estimate could be generated based on the keypoints associated with the tow bar: keypoints 1, 2, and 3. At step 414, a second pose estimate may be generated based on a second set of keypoints. Again referring to FIG. 5B, the second pose estimate could be generated based on keypoints associated with the main body of the trailer: keypoints 4, 5, 6, and 7. At step 416, the two estimates are combined in a suitable manner to determine the pose of the trailer. In some embodiments, the two estimates are combined according to a weighting function that weights the two estimates based on the reliability of the respective estimate. Since the reliability may vary depending on various factors that may change from one image to another, the weighting function may be dynamic. For example, the pose estimate based on the trailer main body may be more reliable in far distance than the tow bar-based pose estimate since the tow bar may be difficult to identify when the trailer is far away, and therefore, the weighting function may weight the trailer pose estimate more highly than the tow bar pose estimate in far distance. As the vehicle nears the trailer when backing toward the trailer, the tow bar may become clearer in the imaging and a clear tow bar may provide a better estimate of trailer pose than the main body. As such, the weight of the tow bar-based pose estimate may be higher than that of the main body pose estimate in near distance. The weighting function, therefore, could be a function of the distance between the trailer and vehicle. This is merely one example of a weighting function. Weighting functions could take into account any suitable parameters, including one or more of: clarity of the image, brightness of the image, size of the trailer, size of one or more features of the trailer, etc.

Method 400 continues to step 418 in which the location of the coupler and the pose of the trailer are output for maneuvering the vehicle into position for hitching the trailer to the vehicle. The coupler location and trailer pose may be output, for example, to a path generator (which may be implemented in the same computing system that determines the coupler position and trailer pose or a different computing system) that generates a path for the vehicle to move into position in which the hitch ball of the vehicle is aligned with the coupler of the trailer and the vehicle is aligned with the pose of the trailer. The vehicle may then be autonomously or semi-autonomously controlled to move the vehicle along the generated path.

Outputting the coupler position and trailer pose can include storing them in a memory for retrieval and use by another software module, system, or subsystem. The coupler position and trailer pose may be retrieved from the memory for use in vehicle path planning, such as by path executor 206 of FIG. 2. In some embodiments, the coupler position and trailer pose detection are performed by a system that is distinct from a maneuvering system that determines the path of the vehicle for hitching, and the coupler position and trailer pose may be transmitted to the maneuvering system. In some embodiments, a single system (e.g., a single driver assist system) performs coupler position and trailer pose determination and path planning and the coupler position and trailer pose may be generated by a first software module of the single system and provided to a second software module of the system that determines the path.

Method 400 may be repeated as the vehicle moves toward the trailer, with the keypoint locations updated, the coupler position and trailer pose estimates updated, and the path updated over time. Method 400 may be performed for each image or video frame generated by the camera system or may be performed periodically, such as based on a certain frame interval or a certain time interval. As the vehicle moves closer to the trailer, the accuracy of the keypoints may increase due to the clarity and size of the features of the trailer in the image increasing. Thus, the estimations of the position of the coupler and the trailer pose may increase over time. According to various embodiments, this increase in accuracy can be provided by using just a single machine-learning model, which can reduce the processing time and power needed for determining trailer position and pose.

Figure 7:
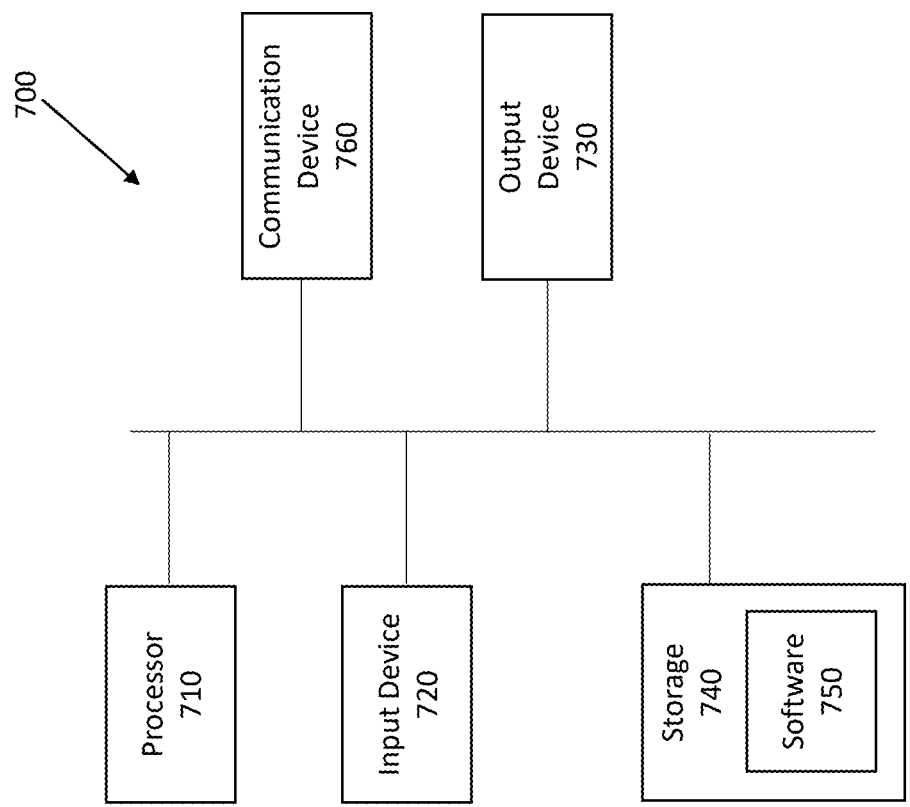
FIG. 7 is a functional block diagram of an exemplary computing system.

FIG. 7 illustrates an example of a computing system 700, in accordance with some embodiments, that can be used for one or more of components discussed above, such as for hitching assist system 104 of FIG. 1, hitching assist system 200 of FIG. 2, and/or position and pose estimator 300 of FIG. 3. As shown in FIG. 7, system 700 can be any suitable type of processor-based system, such as a handheld computing device (portable electronic device) such as a phone or tablet, or a dedicated device. The system 700 can include, for example, one or more of input device 720, output device 730, one or more processors 710, storage 740, and communication device 760. Input device 720 and output device 730 can generally correspond to those described above and can either be connectable or integrated with the computer.

Input device 720 can be any suitable device that provides input, such as a touch screen, keyboard or keypad, mouse, gesture recognition component of a virtual/augmented reality system, or voice-recognition device. Output device 730 can be or include any suitable device that provides output, such as a display, touch screen, haptics device, virtual/augmented reality display, or speaker.

Storage 740 can be any suitable device that provides storage, such as an electrical, magnetic, or optical memory including a RAM, cache, hard drive, removable storage disk, or other non-transitory computer-readable medium. Communication device 760 can include any suitable device capable of transmitting and receiving signals over a network, such as a network interface chip or device. The components of the computing system 700 can be connected in any suitable manner, such as via a physical bus or wirelessly.

Processor(s) 710 can be any suitable processor or combination of processors, including any of, or any combination of, a central processing unit (CPU), graphics processing unit (GPU), field programmable gate array (FPGA), and application-specific integrated circuit (ASIC). Software 750, which can be stored in storage 740 and executed by one or more processors 710, can include, for example, the programming that embodies the functionality or portions of the functionality of the present disclosure (e.g., as embodied in the devices as described above). For example, software 750 can include one or more programs for execution by one or more processor(s) 710 for performing one or more of the steps of method 400.

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport computer-readable medium can include, but is not limited to, an electronic, magnetic, optical, electromagnetic, or infrared wired or wireless propagation medium.

System 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application is hereby incorporated herein by reference.

The invention claimed is:

1. A method for determining a location and pose of at least one trailer for hitching to a vehicle comprising:
   receiving, by at least one processor, at least one image of at least one trailer generated from at least one camera of the vehicle;
   locating, by the at least one processor, the at least one trailer in the at least one image;
   determining, by the at least one processor, a plurality of keypoints associated with the at least one trailer in the image using at least one machine learning model;
   determining, by the at least one processor, a location of a coupler of the at least one trailer relative to the vehicle and a pose of the at least one trailer relative to the vehicle based on the determined keypoints; and
   determining, by the at least one processor, a path for maneuvering the vehicle into position for hitching the at least one trailer to the vehicle based on the location of the coupler of the at least one trailer and the pose of the at least one trailer,
   wherein the keypoints comprise a first set of keypoints and a second set of keypoints, and determining the pose of the at least one trailer comprises:
      generating, by the at least one processor, a first estimate of the pose of the at least one trailer based on the first set of keypoints;
      generating, by the at least one processor, a second estimate of the pose of the at least one trailer based on the second set of keypoints; and
      determining, by the at least one processor, the pose of the at least one trailer based on the first and second estimates,
   wherein the first and second estimates of the pose of the at least one trailer are weighted based on a distance from the vehicle to the at least one trailer, and
   wherein the location of the coupler and the pose of the at least one trailer are determined based on image data only captured by the at least one camera of the vehicle.

2. The method of claim 1, wherein the first set of keypoints is associated with a tow bar of the at least one trailer and the second set of keypoints is associated with a body of the at least one trailer from which the tow bar extends.

3. The method of claim 2, wherein the first estimate of the pose is weighted lower than the second estimate of the pose for a first distance between the vehicle and the to the at least one trailer and the first estimate of the pose is weighted higher than the second estimate of the pose for a second distance, less than the first distance, between the vehicle and the at least one trailer.

4. The method of claim 1, further comprising updating, by the at least one processor, the location of the coupler of the at least one trailer and a pose of the at least one trailer based on new images generated as the vehicle maneuvers toward the at least one trailer.

5. The method of claim 1, wherein the at least one image captures a plurality of trailers and keypoints are identified for the plurality of trailers.

6. The method of claim 5, wherein the location of the coupler of the at least one trailer and the pose of the at least one trailer are determined for a trailer selected by a driver of the vehicle from among the plurality of trailers in the at least one image.

7. The method of claim 1, wherein a single machine learning model locates the at least one trailer and determines the plurality of keypoints.

8. The method of claim 7, wherein the single machine learning model comprises a keypoint detector.

9. The method of claim 1, wherein the at least one image includes representations of a plurality of trailers, locating the at least one trailer comprises simultaneously locating each trailer in the at least one image, and determining the keypoints comprises determining keypoints for each trailer in the at least one image simultaneously.

10. The method of claim 1, wherein the first and second estimates of the pose of the at least one trailer are weighted based on at least one of a brightness level of the at least one image, trailer type of the at least one trailer, and a size of the at least one trailer.

11. A system for determining a location and pose of at least one trailer for hitching to a vehicle, the system comprising one or more processors, memory, and one or more programs stored in the memory and including instructions for execution by the one or more processors for:
    receiving at least one image of at least one trailer generated by a camera of the vehicle;
    locating the at least one trailer in the at least one image;
    determining a plurality of keypoints associated with at least one trailer in the image using at least one machine learning model;
    determining a location of a coupler of the at least one trailer relative to the vehicle and a pose of the at least one trailer relative to the vehicle based on the determined keypoints; and
    determining a path for maneuvering the vehicle into position for hitching the at least one trailer to the vehicle based on the location of the coupler of the at least one trailer and the pose of the at least one trailer,
    wherein the keypoints comprise a first set of keypoints associated with a tow bar of the at least one trailer and a second set of keypoints associated with a body of the at least one trailer from which the tow bar extends,
    wherein determining the pose of the at least one trailer comprises:
        generating a first estimate of the pose of the at least one trailer based on the first set of keypoints;
        generating a second estimate of the pose of the at least one trailer based on the second set of keypoints; and
        determining the pose of the at least one trailer based on the first and second estimates,
    wherein the location of the coupler and the pose of the at least one trailer are determined based on image data only captured by the at least one camera of the vehicle.

12. The system of claim 11, wherein the first and second estimates of the pose of the at least one trailer are weighted based on a distance from the vehicle to the at least one trailer.

13. The system of claim 12, wherein the first estimate of the pose is weighted lower than the second estimate of the pose for a first distance between the vehicle and the at least one trailer, and the first estimate of the pose is weighted higher than the second estimate of the pose for second distance, less than the first distance, between the vehicle and the at least one trailer.

14. The system of claim 11, wherein the one or more programs including instructions for: updating the location of the coupler of the at least one trailer and a pose of the at least one trailer based on new images generated as the vehicle maneuvers toward the at least one trailer.

15. The system of claim 11, wherein the at least one image captures a plurality of trailers and keypoints are identified for the plurality of trailers.

16. The system of claim 15, wherein the location of the coupler of the at least one trailer and the pose of the at least one trailer are determined for a trailer selected by a driver of the vehicle from among the plurality of trailers in the at least one image.

17. The system of claim 11, wherein a single machine learning model locates the at least one trailer and determines the plurality of keypoints.

18. The system of claim 17, wherein the single machine learning model comprises a keypoint detector.

19. The system of claim 11, wherein the at least one image includes representations of a plurality of trailers, and wherein the at least one processor comprises a trained machine learning model which locates each trailer representation in the at least one image and determines the keypoints.

20. The system of claim 11, wherein the at least one image includes representations of a plurality of trailers, and the plurality of trailers are located in the at least one image simultaneously, and the keypoints for each trailer in the at least one image are determined simultaneously.

21. The system of claim 11, wherein the at least one image includes representations of a plurality of trailers, and wherein the at least one processor comprises a first trained neural network or machine learning model which defines a bounding box surrounding each trailer in the at least one image, and further comprises a second trained neural network or machine learning model which determines the keypoints of the at least one trailer within each bounding box.

22. The system of claim 11, wherein the at least one image includes representations of a plurality of trailers, the at least one processor comprises one trained neural network or one machine learning model which defines a bounding box surrounding each trailer in the at least one image and determines the keypoints of the at least one trailer within each bounding box.

* * * * *